United States Patent [19]

Stettler, Jr.

[11] Patent Number: 4,867,010

[45] Date of Patent: Sep. 19, 1989

[54] DIFFERENTIAL LOCK WITH NON-ROTATING HYDRAULICALLY ACTUATED PISTON

[75] Inventor: Werner Stettler, Jr., Cedar Falls, Iowa

[73] Assignee: Deere & Company, Moline, Ill.

[21] Appl. No.: 225,426

[22] Filed: Jul. 28, 1988

[51] Int. Cl.⁴ .............................................. F16H 1/44
[52] U.S. Cl. .................................................. 74/710.5
[58] Field of Search ............................... 74/711, 710.5

[56] References Cited

U.S. PATENT DOCUMENTS

| | | | |
|---|---|---|---|
| 3,460,404 | 8/1969 | Schmid | 74/710.5 |
| 3,913,414 | 10/1975 | Freiburger | 74/710.5 |
| 4,235,307 | 11/1980 | Browning et al. | 184/6.12 |
| 4,245,525 | 1/1981 | LeBegue | 74/711 |
| 4,412,459 | 11/1983 | Goscenski, Jr. | 74/711 |
| 4,583,424 | 4/1986 | von Hiddessen et al. | 74/711 X |
| 4,644,823 | 2/1987 | Mueller | 74/710.5 |
| 4,679,463 | 7/1987 | Ozaki et al. | 74/711 |
| 4,715,248 | 12/1987 | Gant | 74/710.5 |

FOREIGN PATENT DOCUMENTS 1934340 1/1971 Fed. Rep. of Germany ..... 74/710.5
1379416 1/1975 United Kingdom .

*Primary Examiner*—Dirk Wright

[57] ABSTRACT

A differential lock is activated by a non-rotating piston mounted substantially inside the side quill of the differential. Non-rotating seals are provided between the side quill and the piston to form a pressure chamber for the piston. A thrust bearing is provided between the piston and the pressure plate of the clutch of the differential lock to transmit force from the piston to the clutch while allowing relative rotation therebetween.

9 Claims, 1 Drawing Sheet

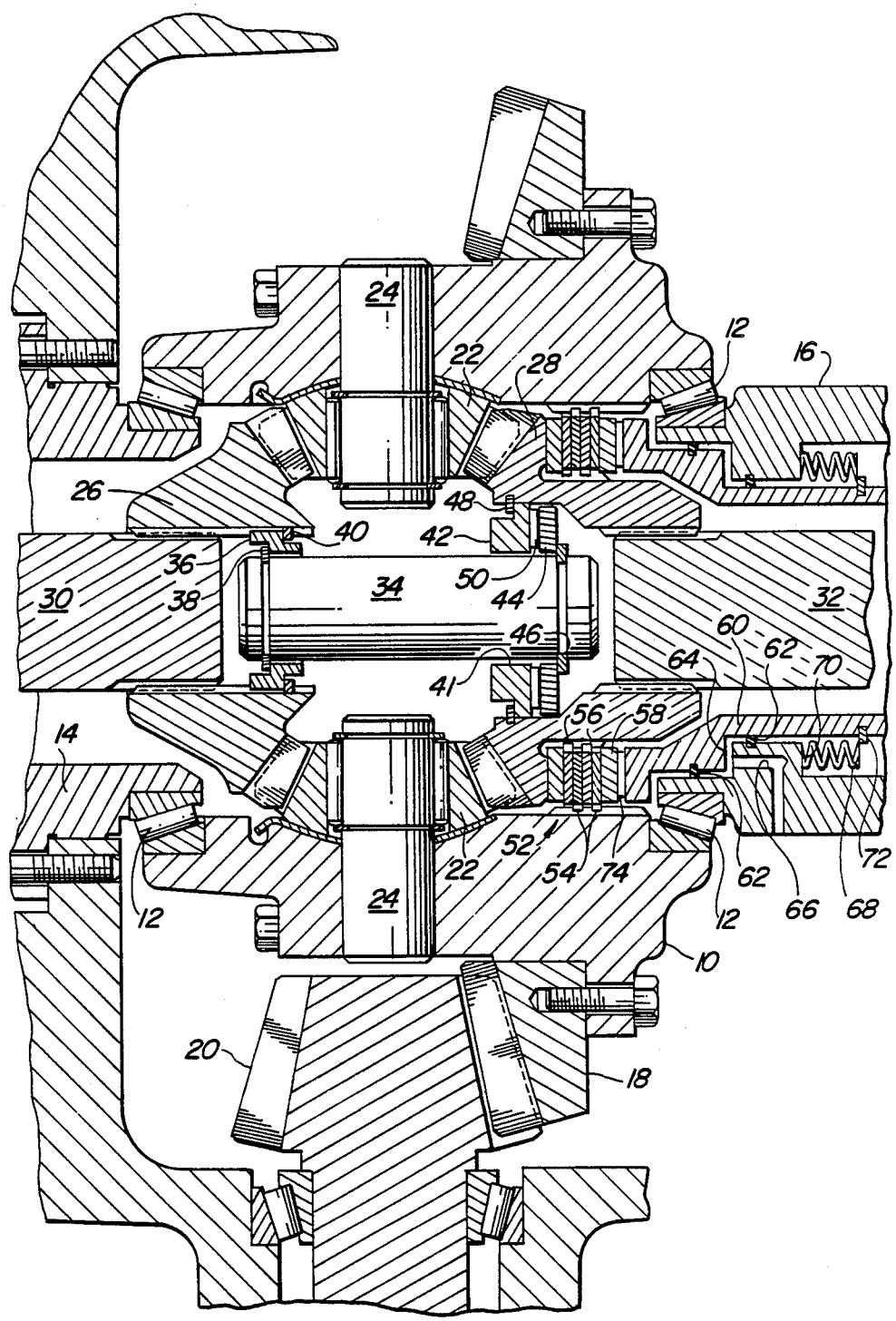

DIFFERENTIAL LOCK WITH NON-ROTATING HYDRAULICALLY ACTUATED PISTON

BACKGROUND OF THE INVENTION

1. Field of the Invention

The present invention relates to differential locks for vehicle differentials, and particularly to the mechanism for activating the differential lock.

2. Description of the Related Art

A differential typically is provided in a vehicle to allow speed differences between driven wheels on either side of the vehicle during cornering. One problem with using a differential for this purpose is that if one of the wheels connected to the differential looses traction, drive to both wheels fails. Accordingly, the differentials of vehicles which are likely to loose traction on one of their wheels, e.g., off-road vehicles, typically are provided with a differential lock to selectively prevent relative rotation of the parts of the differential.

While there are many types of differential locks, one of the more common is a hydraulically actuated clutch which, when activated, prevents relative rotation between the housing of the differential and one of the side gears of the differential. Such clutches normally are activated by a hydraulic piston that rotates with the differential, e.g., as taught in U.S. Pat. No. 3,913,414 (Freiburger). The disadvantage to this structure is that rotating seals are required somewhere in the hydraulic system providing oil to move the piston.

Such rotating seals have several disadvantages. First, they almost always inherently leak. If the differential lock is used in an independent axle spaced away from the remainder of the transmission, some means must be devised to return the leaked oil to the reservoir from which it came, e.g., as taught in U.S. Pat. No. 4,235,307 (Browning et al.). Second, such seals generally have a maximum pressure limit of about 2700-4100 kPa (400-600 psi). Many off-road vehicles are work vehicles, e.g., tractors, bulldozers and the like, which have a typical system pressure of about 15,500 kPa (2250 psi). This means that a pressure-reducing valve must be provided to supply hydraulic fluid to operate the differential lock.

U.S. Pat. Nos. 4,644,823 (Mueller) and 4,679,463 (Ozaki et al.) partially overcome these problems by providing non-rotating pistons located in the differential housing, but at the cost of extra size in the differential housing. In addition, both of these devices use specialized differential housings, which decreases manufacturing flexibility.

SUMMARY OF THE INVENTION

It therefore is an object of the invention to provide an improved differential lock which overcomes the shortcomings of the prior art.

This object is accomplished according to the present invention by providing a differential lock activated by a non-rotating piston. The piston is provided substantially inside at least one of the side quills of the differential, which do not rotate with respect to the vehicle in which the differential is mounted. Non-rotating seals then can be used in the system providing pressure to activate the piston. Non-rotating seals are available which can withstand 15,500 kPa (2250 psi) without leakage, allowing elimination of both the pressure-reducing valve and the return system previously required.

Thrust bearings provided between the piston and the clutch allow relative rotation therebetween, while simultaneously allowing transmission of thrust forces from the piston to the clutch. A needle bearing is preferred, although any alternative bearing can be used.

With proper sizing of parts, the only elements which must be added to the differential to make it a locking differential are substantially contained inside the side quill. The remaining parts are the same as for a non-lockable differential, or a limited slip differential. Thus, only a small extra amount of parts must be maintained in inventory to allow the option of providing a selectivity lockable differential, a limited slip differential of a non-locking differential, thereby increasing manufacturing flexibility.

BRIEF DESCRIPTION OF THE DRAWING

The invention will be described in greater detail with reference to the single drawing, which is a cross-sectional view of a preferred embodiment of a differential having a differential lock according to the present invention.

DETAILED DESCRIPTION OF THE PREFERRED EMBODIMENTS

The single FIGURE illustrates a preferred embodiment of the differential according to the present invention having a differential housing 10 rotatably mounted by bearings 12 to side quills 14, 16, which in turn are non-rotatably mounted to a vehicle body (not shown). A ring gear 18 is mounted to the outside of the differential housing 10 and driven by a drive shaft pinion 20 directly connected to the engine of the vehicle (not shown). A plurality of differential pinions 22 are rotatably mounted inside the housing 10 by a corresponding plurality of pinion pins 24. Differential side gears 26, 28 engage the pinion gears 22 and are mounted for rotation with drive shafts 20, 32 which in turn are drivingly connected to the wheels of the vehicle (not shown).

Upon operation of the differential, the differential side gears 26, 28 will be pressed axially away from the center of the differential. Resulting motion is conveniently prevented by use of a cross shaft 34. The left end of the cross shaft 34 as seen in the drawing extends through a ring 36 which is fixed for rotation with the differential side gear 26, e.g., by splines. The cross shaft 34 itself is also fixed for rotation with the ring 36, e.g., by splines, having a hexigonal shape, or the like. The cross shaft 34 is prevented from moving to the right relative to the ring 36 by a lock ring 38. The ring 36 is prevented from moving to the right relative to the differential side gear 26 by a lock ring 40. The right end of the cross shaft 34 extends through a central opening 41 of an inner ring 42 which rotates with the side gear 28. The central opening 41 in the inner ring 42 is sized such that the cross shaft 34 does not contact it. An outer ring 44 rotates with the cross shaft 34, due to splines, a hexagonal shape, or the like. The cross shaft 34 is prevented from moving to the left relative to the outer ring 44 by a lock ring 46 and the inner ring 42 is prevented from moving to the left relative to the side gear 28 by a lock ring 48. Finally, a thrust bearing 50 is provided between the inner ring 42 and the outer ring 44, preferably in the form of a needle-thrust bearing. The effect of this construction is that the cross shaft 34 prevents axial spreading of the side gears 26, 28 while allowing relative rotation therebetween via the thrust bearing 50.

Turning to the differential lock, the right side gear 28 can be fixed for rotation with the differential housing 10 by a clutch 52. The clutch 52 includes separator plates 54 fixed for rotation with the differential housing 10 and clutch disks 56 fixed for rotation with the side gear 28. A clutch pressure plate 58 is provided on the right-hand end of the clutch pack 54, 56.

The non-rotating piston 60 is positioned in the non-rotating side quill 16. While the piston 60 can have any shape, it preferably is annular to distrubute actuating pressure evenly around the clutch pressure plate 58. Seals 62 extend between the piston 60 and the side quill 16 to form a hydraulic chamber 64 therebetween. Hydraulic fluid can be provided to this chamber via a supply passage 66 connected to a source of pressurized fluid (not shown). De-activation of the piston is conveniently accomplished by providing a piston return spring 68 compressed between a surface 70 of the side quill 16 and a lock ring 72 on the piston 60. Finally, a thrust bearing 74 is provided between the piston 60 and the clutch pressure plate 58 to transmit pressure from the piston 60 to the pressure plate 58 while allowing relative rotation therebetween. The thrust bearing 74 preferably is in the form of a needle bearing or thrust washer, though any other suitable bearing can be used.

In operation, when it is necessary to activate the differential lock, fluid is provided to the chamber 64 via the passage 66. This presses the piston 60 to the left in the FIGURE, pressing the plates 54 and disks 56 together via the plate 58 and thrust bearing 74. This in turn prevents relative rotation of the parts within the differential. Upon release of the pressure in the chamber 64, the return spring 68 pulls the piston away from the clutch pressure plate 58, again allowing relative rotation between the parts of the differential.

Numerous modifications to the present invention will be readily apparent to one of ordinary skill in the art. For example, while the piston has been described as mounted in the side quill, it could simply extend in through the side quill, rather than being mounted therein. Similarly, while the cross shaft 34 provides a convenient mechanism for preventing axial displacement of the side gears 26, 28, any other suitable mechanism could be used, e.g., providing bearing surfaces on the differential housing 10 to support bearings holding the differential side gears 26, 28 against axial displacement.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A lockable differential comprising:
first and second non-rotatable side quills;
a differential housing rotatably mounted about said side quills;
first and second driven shafts extending into said housing through said first and second side quills, respectively;
first and second side gears fixed for rotation with said first and second shafts, respectively;
a plurality of pinion gears rotatably mounted in said differential housing and engaging said side gears;
clutch means for selectively fixing at least said first side gear for rotation with said housing; and
actuating means for selectively actuating said clutch means, said actuating means being positioned substantially within and non-rotating relative to said first side quill, said actuating means comprising:
a thrust bearing for applying pressure directly to said clutch;
a hydraulic piston for applying pressure directly to said thrust bearing.

2. The differential of claim 1, further characterized in that the bearing means is selected from the group consisting of needle bearings and thrust washers.

3. The differential of claim 1, further characterized in that a hydraulic chamber for driving the piston is formed between the piston and the side quill.

4. The differential of claim 3, further characterized in that seals extend between surfaces of the piston and the side quill, said hydraulic chamber being defined between said piston, side quill and seals.

5. The differential of claim 3, further characterized in that return spring means are provided for biasing the actuating means away from the clutch.

6. The lockable differential of claim 1, wherein said actuating means further comprises non-rotating seals extending between said piston and said first side quill to define a hydraulic chamber therebetween.

7. The lockable differential of claim 1, wherein said thrust bearing is selected from the group consisting of needle bearings and thrust washers.

8. A lockable differential comprising:
first and second non-rotatable side quills;
a differential housing rotatably mounted about said side quills;
first and second driven shafts extending into said housing through said first and second side quills, respectively;
first and second side gears fixed for rotation with said first and second shafts, respectively;
a plurality of pinion gears rotatably mounted in said differential housing and engaging said side gears;
clutch means for selectively fixing at least said first side gear for rotation with said housing; and
actuating means for selectively actuating said clutch means, said actuating means being positioned substantially within and non-rotating relative to said first side quill, and comprising:
a hydraulic piston;
non-rotating seals extending between said piston and said first side quill to define a hydraulic chamber therebetween;
an extension of said piston extending beyond said hydraulic chamber in a direction away from said clutch means;
a lock ring on said extension; and
a spring compressed between said lock ring and said first side quill to bias said hydraulic piston away from said clutch means.

9. A lockable differential comprising:
first and second non-rotatable side quills;
a differential housing rotatably mounted about said side quills;
first and second driven shafts extending into said housing through said first and second side quills, respectively;
first and second side gears fixed for rotation with said first and second shafts, respectively;

a plurality of pinion gears rotatably mounted in said differential housing and engaging said side gears;
clutch means for selectively fixing at least said first side gear for rotation with said housing; and
actuating means for selectively actuating said clutch means, said actuating means being positioned substantially within and non-rotating relative to said first side quill;

a cross shaft extending between said first and second side gears;
means for preventing axial and rotary motion of said cross-shaft relative to the other one of said side gears; and
means for preventing axial motion and allowing rotary motion of said cross-shaft relative to the other one of said side gears.

* * * * *